United States Patent [19]

Schanz

[11] 4,116,452
[45] Sep. 26, 1978

[54] SLEEVE SEAL FOR MASTER CYLINDERS OF HYDRAULIC BRAKE SYSTEMS

[75] Inventor: Johannes Schanz, Bad Homburg, Fed. Rep. of Germany

[73] Assignee: ITT Industries, Inc., New York, N.Y.

[21] Appl. No.: 848,839

[22] Filed: Nov. 7, 1977

[51] Int. Cl.² ............................ F16J 9/00; F16J 15/32
[52] U.S. Cl. .......................... 277/205; 277/212 C; 92/240
[58] Field of Search ............. 92/240, 244; 277/205, 277/206 R, 212 R, 212 C

[56] References Cited

U.S. PATENT DOCUMENTS

| 2,731,315 | 1/1956 | Church | 92/244 X |
| 2,781,208 | 2/1957 | Foss | 277/212 R |
| 3,498,623 | 3/1970 | Rowe | 277/206 |
| 3,505,930 | 4/1970 | Schrader | 92/240 |
| 3,550,990 | 12/1970 | Rentschler et al. | 277/205 |
| 3,915,463 | 10/1975 | Pippert | 277/205 |

FOREIGN PATENT DOCUMENTS

| 550,298 | 12/1922 | France | 277/206 |
| 875,744 | 5/1953 | Fed. Rep. of Germany | 277/206 |

Primary Examiner—Robert S. Ward, Jr.
Attorney, Agent, or Firm—John T. O'Halloran; Alfred C. Hill

[57] ABSTRACT

A sleeve seal for sealing a front end of a piston and a cylinder wall wherein the front surface of the sleeve seal remote from the front end of the piston is provided with circular coaxial undulations.

1 Claim, 1 Drawing Figure

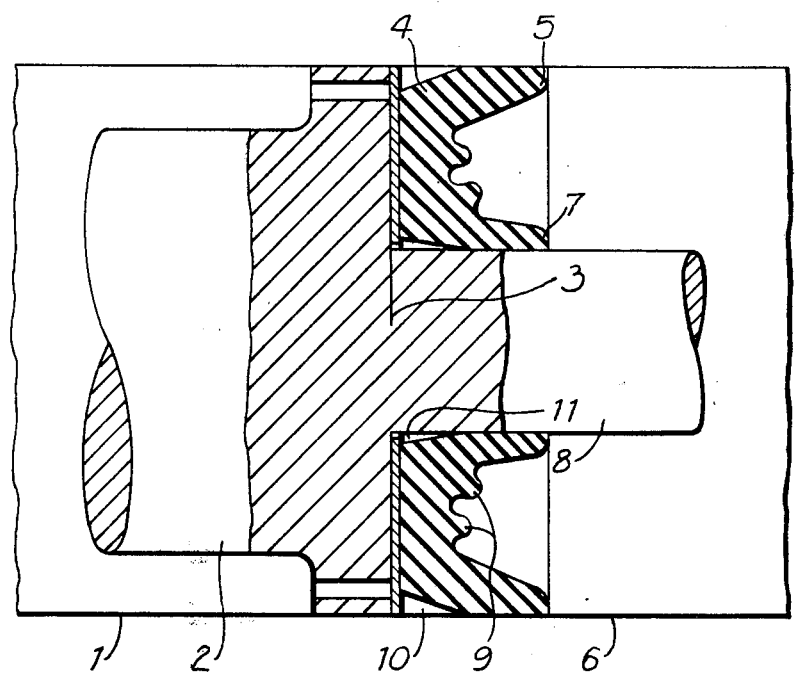

SLEEVE SEAL FOR MASTER CYLINDERS OF HYDRAULIC BRAKE SYSTEMS

BACKGROUND OF THE INVENTION

The present invention relates to a sleeve seal for sealing a front end of a piston towards a cylinder wall, with the sleeve seal having a sealing lip the front part of which rests against the cylinder wall while its rear surface rests against a front end of the piston.

Sleeve seals of this type are used, for example, in master cylinders for hydraulic braking systems. As an example of the state of the art, reference is made to German Pat. Dt-PS No. 1,655,308. To improve the sealing action and reduce friction, only the front part of the sealing lip of such sleeve seals rests against the cylinder wall. Experience has shown that in the case of sleeve seals of this type cracks may occasionally occur in the transition area between the sealing lip and the area of the sleeve seal parallel with the piston end and in the parallel area. The causes have been unknown hitherto, but it would seem that they lie in the alternation of surface stresses caused by continuous loading, particularly in the parallel area.

SUMMARY OF THE INVENTION

It is the object of the present invention to design a sleeve seal of the type initially referred to in a manner reducing the formation of cracks without making the device substantially more expensive.

A feature of the present invention is the provision of a sleeve seal for sealing a front end of a piston and a cylinder wall, with the sleeve seal having an outer sealing lip whose front part rests against the cylinder while its rear surface rests against a front end of the piston comprising: circular coaxial undulations disposed in a front surface of the sleeve seal remote from the front end of the piston.

The reason of this design is that the following was realized: In the case of higher pressures, also the rear part of the sleeve seal endeavours to rest against the outer cylinder wall. However, since higher pressures cause the sleeve seal to rest against the front end of the piston at a high force, radial displacement of the sleeve seal is not allowed to occur there in the case of elongation of the sleeve seal. This makes it necessary for the sleeve seal to be strongly elongated in the area of its front surface which may cause occasional cracks as a result of the alternating surface stresses. By providing this area with undulations according to the present invention, an elongation of the sleeve seal is made possible using simple means so that the formation of cracks may be avoided.

BRIEF DESCRIPTION OF THE DRAWING

The above-mentioned and other features and objects of the present invention and the manner of obtaining them will become more apparent by reference to the following description taken in conjunction with the drawing, the single FIGURE of which schematically illustrates an embodiment in accordance with the principles of the present invention.

DESCRIPTION OF THE PREFERRED EMBODIMENT

The drawing shows a cylinder 1 accommodating a piston 2 axially slidably therein. Piston 2 has a front end 3 against which a sleeve seal 4 rests. Sleeve seal 4 has an outer sealing lip 5 with which it rests against a wall 6 of cylinder 1. In addition, sleeve seal 4 has an inner sealing lip 7 with which it rests against a cylindrical extension 8 of piston 2 in a sealing relationship thereto. To reduce friction and improve the sealing action, sleeve seal 4 does not rest against wall 6 of cylinder 1 in the rear area closest to piston 2.

The front surface of sleeve seal 4 remote from the front end 3 of piston 2 is provided with undulations 9 constructed in accordance with the invention. Several undulations form coaxial circles similar to the waves developing on water upon dropping a stone. In the drawing, reference numerals 10 and 11 designate spaces between sleeve seal 4 and wall 6 of cylinder 1 as well as between sleeve seal 4 and extension 8 of piston 2, respectively, which spaces are not occupied by sleeve seal 4. If a higher pressure develops in the chamber in front of sleeve seal 4 as piston 2 is displaced, sleeve seal 4 will attempt to extend into spaces 10 and 11. However, in view of the fact that in that case sleeve seal 4 rests with a high force against the front end 3 of piston 2, it is not possible for the material of sleeve seal 4 to become displaced there. But, owing to the undulations 9, an elongation of the front surface of sleeve seal 4 is easily accomplished so that sleeve seal 4 is allowed to extend into spaces 10 and 11 without cracks occurring.

While I have described above the principles of my invention in connection with specific apparatus it is to be clearly understood that this description is made only by way of example and not as a limitation to the scope of my invention as set forth in the objects thereof and in the accompanying claims.

I claim:

1. A sleeve seal for master cylinders of hydraulic brake systems comprising:

cylindrical cylinder wall having a longitudinal axis;

a piston disposed in said cylinder wall coaxial of said axis, said piston having a front end and a given diameter;

a cylindrical piston extension disposed coaxial of said axia and connected to said front end of said piston, said piston extension having a diameter less than said given diameter; and said sleeve seal including a flat surface transverse of said axis resting against said front end of said piston adjacent the outer surface of said piston extension and the inner surface of said cylinder wall, said flat surface providing a space adjacent the inner surface of said cylinder wall and a space adjacent the outer surface of said piston extension, an outer elongated, circular sealing lip extending from said flat surface resting against the inner surface of said cylinder wall, an inner elongated, circular sealing lip extending from said flat surface resting against the outer surface of said piston extension, and circular coaxial undulations disposed in the front surface of said sleeve seal spaced from said flat surface between said outer and inner sealing lips.

* * * * *